July 12, 1955 R. GOERLICH 2,712,910

PNEUMATIC TUBE SYSTEM WITH FULLY AUTOMATIC RELOAD DEVICE CONNECTING INCOMING TO OUTGOING DISPATCH DUCTS

Filed Feb. 6, 1953 3 Sheets-Sheet 1

Inventor:
REINHARD GOERLICH
BY Robert Harding Jr.
ATTORNEY

Inventor:
Reinhard Goerlich by Robert Harding Jr.
Attorney

PNEUMATIC TUBE SYSTEM WITH FULLY AUTOMATIC RELOAD DEVICE CONNECTING INCOMING TO OUTGOING DISPATCH DUCTS.

Filed Feb. 6, 1953 3 Sheets-Sheet 3

Inventor:
Reinhard Goerlich by Robert Harding Jr.
Attorney 2,712,910

PNEUMATIC TUBE SYSTEM WITH FULLY AUTOMATIC RELOAD DEVICE CONNECTING INCOMING TO OUTGOING DISPATCH DUCTS

Reinhard Goerlich, Berlin-Schoeneberg, Germany, assignor to International Standard Electric Corporation, New York, N. Y., a corporation of Delaware Application February 6, 1953, Serial No. 335,431

Claims priority, application Germany February 16, 1952

11 Claims. (Cl. 243—16)

This invention relates to an improvement in pneumatic tube dispatch systems and more particularly to apparatus for altering the path of travel of certain carriers in the system.

In pneumatic tube dispatch systems, it is known to provide a central reload position where the carriers are supplied with a characteristic destination marking for electrical control of switching apparatus to effect switching of a carrier to the proper duct in accordance with the destination marking thereon. Such reload positions connecting the incoming and outgoing ducts with each other are generally designed as central or multiple turnoff switching arrangements. It is also known to provide a rotatable drum for reload purposes and into which an incoming carrier is conducted and then turned into such an angular position that the carrier can glide out into the duct that corresponds to its destination mark.

The central reload contrivances so far known involve the disadvantage that the carriers can be sluiced through them sequentially which causes congestion under heavy traffic conditions. Traffic efficiency of such systems is therefore limited. Efficiency is not materially increased shortening the time intervals for the sensing and conducting through of carriers, for instance through sensing carriers during travel.

The purpose of the invention is to create a full-automatic reload arrangement that avoids to the greatest possible extent, even at peak traffic loads, congestion of carriers at the reload position. The invention achieves this goal so that carriers may be connected from incoming to outgoing ducts through a conveyor device which can simultaneously receive a multiplicity of carriers emerging from the incoming ducts, and which device further conducts out the carriers, after sensing their destination marks, to those outgoing ducts that correspond to their destination marks whereby carriers with different destination marking can be conducted out simultaneously.

The advantage of such a reload arrangement is thus to be seen in the fact that the carriers are not sluiced through singly one after the other as is the case with the known central and multiple turnoff switching arrangements, but that several carriers can be redirected independent of one another and eventually simultaneously. This results in an essential increase of efficiency under heavy traffic conditions.

The invention can be applied with particular advantage in the case where existing pneumatic tube installations with manual reload position are to be changed over to full-automatic operation, since this change may be so effected that no alterations are required of the existing duct system and the necessity is eliminated to stop manual operation until up to the time of completed change-over. The conveyor device can be designed adaptable to meet any conveyance conditions depending upon the position of the incoming and outgoing ducts.

According to another embodiment of the invention, the conveyor device consists of a carrier chain, guided in fixed rails by rollers. The carrier chain is inclined from the horizontal plane.

According to a further feature of the invention, the carriers emerging from the incoming ducts and received by the conveyor device are so carried by the latter that the virtual axis of the carriers lies normal to the direction of motion of the conveyor device. Thereby, according to the further design of the invention, the feed portion of the carrier device is provided for the reception of carriers and the return portion for conducting the carriers to a point corresponding to the entrance of the outgoing duct. Through such a design of the conveyor device, the carriers may be conducted to the proper outgoing duct and in proper position for travel thereinto.

According to the invention, the conveyor device may consist of fixed and movable links. Carriers expelled from the incoming ducts are turned by 180 degrees through a redirecting device and are passed on to the movable links of the conveyor chain. That means, this reload contrivance is then used to advantage when incoming and outgoing ducts have the same spatial position.

The invention will now be described in more detail with reference to two embodiments shown in Figures 1–5, wherein:

Fig. 1 is a front view of a reload position;

Fig. 1*a* is a side view of a reload position;

Figure 1:
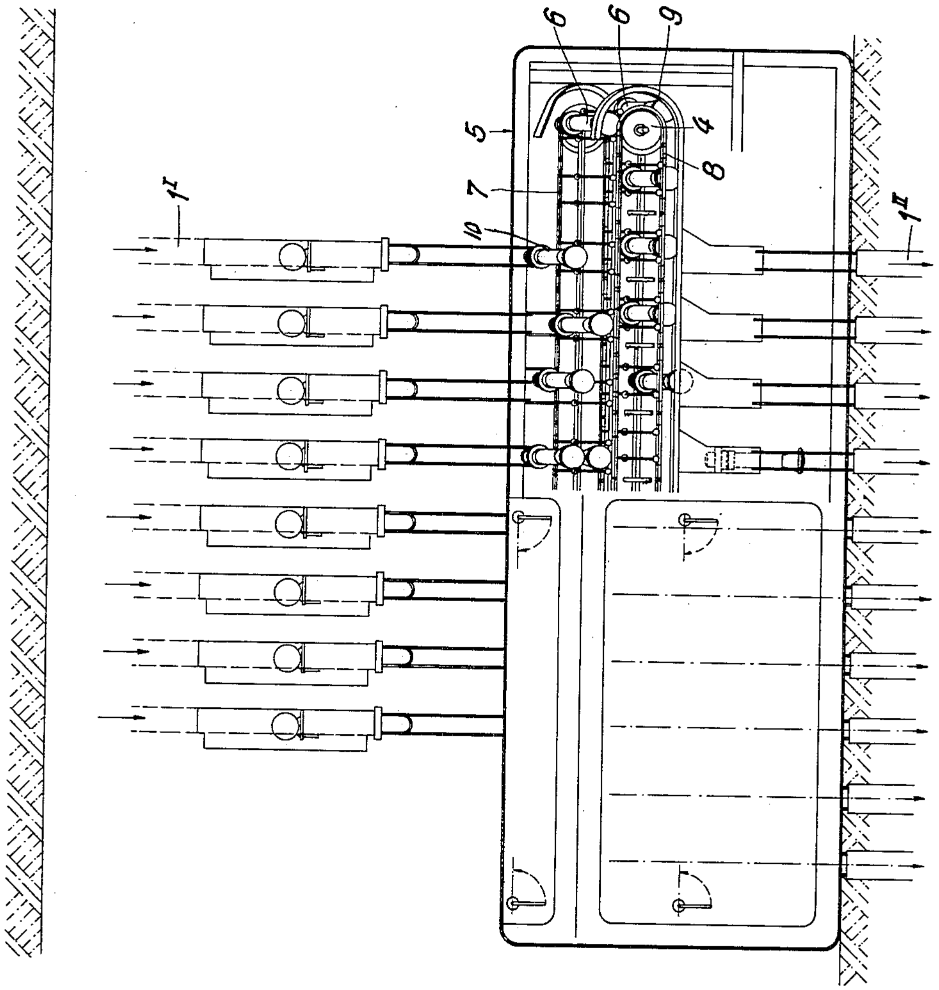
Figure 1A:
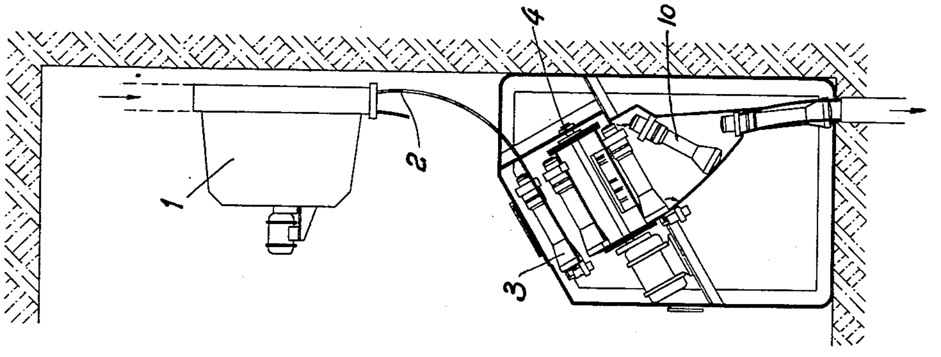

Referring now to Fig. 1 there are shown carriers **1*a*** which pass through the ducts of the pneumatic tube system.

The carriers dropping out of the ducts 1' are distributed by the reload arrangement to the outgoing ducts 1'' in accordance with their destination markings. Destination markings may be applied to the carriers in accordance with the teachings contained in my co-pending application bearing Serial No. 283,860, filed April 23, 1952, now Patent No. 2,667,314. It may be assumed that the incoming ducts 1' are above the reload position and the outgoing ducts 1'' are below the reload position. The upper ducts end in carrier separators 1 (carrier selectors) of conventional design. These carrier selectors here have no other task but to implement the conducting out of carriers in a definite sequence, as will be described below in more detail. Adjacent these carrier selectors, round barguides 2 are provided for the purpose of guiding the carriers when they leave the selectors to receiving tracks 3. In the arrangement shown, the receiving tracks are inclined at an angle from the horizontal plane.

Figure 2:
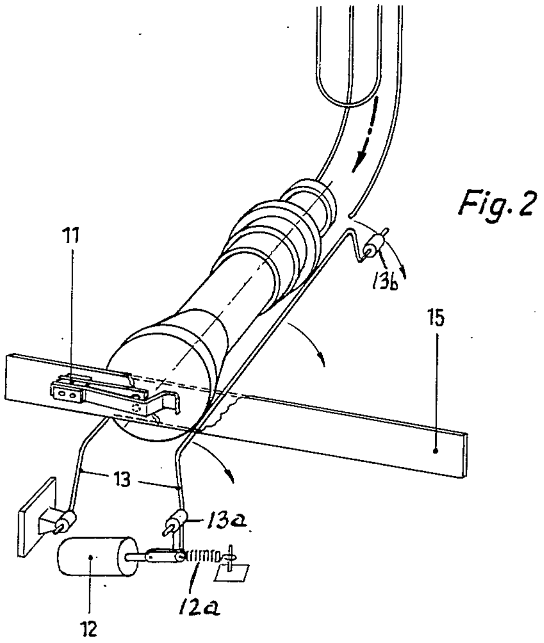
Fig. 2 is a schematic view of a carrier positioned on the receiving track overhead of the conveyor chain.

The carriers arriving from the incoming ducts 1' to the carrier separators which are released as soon as a previous carrier which may occupy receiving track 3 has been disposed of. Receiving track 3 comprises a pair of spaced round parallel bars 13 as shown more clearly in Fig. 2. Either one or both of the bars 13 may be arranged to pivot on pivots **13*a* under control of an electromagnet 12 against the tension of spring 12*a*. The effect of pivoting bar 13 will be to increase the distance of a spacing between said bars or increase the gage of the track defined by said bars. In the event that a carrier 10 is resting on the receiving bars 13 as shown in Fig. 2, actuation of the magnet 12 will cause the carrier 10** to drop under force of gravity when the spacing between the bars exceeds the diameter of the carrier. The carrier will drop between the bars as shown clearly in Fig. 3.

Figure 4:
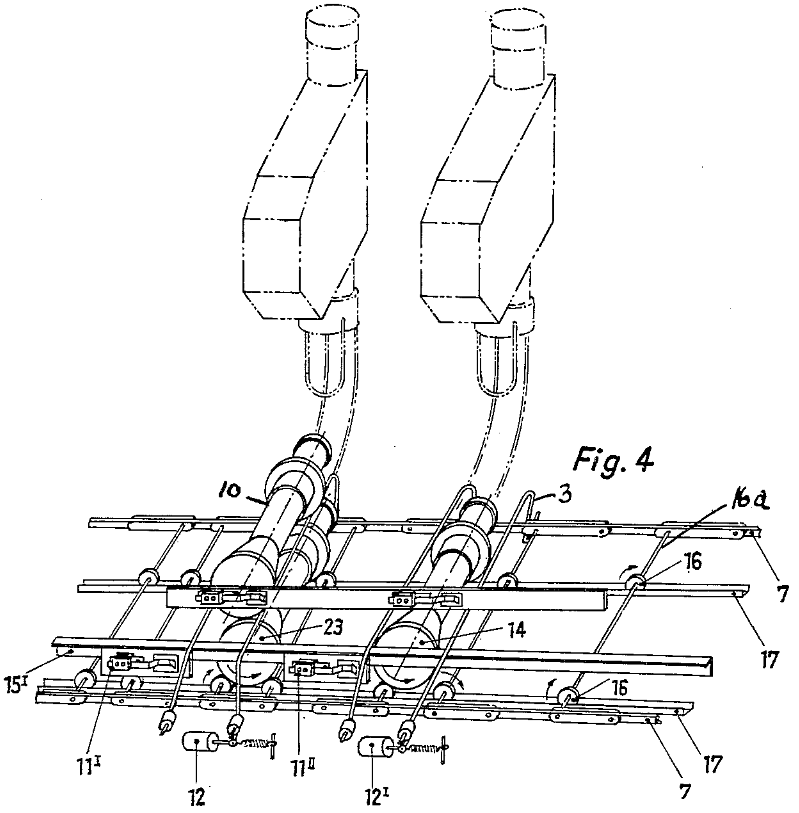
Fig. 4 is a schematic view illustrating a section of the feed track.

As shown in Fig. 4 a conveyor chain 7 is positioned below the receiving track 3 and lies parallel with the inclined plane thereof.

The conveyor chain 7 consists of a pair of spaced endless chains which pass around end sprockets 4. The two chains are connected by spaced connecting rods 16*a* and which rods carry movable rollers 16. The rollers 16 ride in U-shaped rails 17 which rails lie parallel to the direction of movement of the chains and which rails lie spaced and parallel to each other in different planes, the spacing between planes corresponding to the angle of tilt of the receiving track 3. The connecting rods 16*a* are so placed as to provide pairs of rods and associated rollers 16 capable of accommodating a carrier device 10 thereon and to impart rolling motion thereto as will be plainly seen in Fig. 4 indicated by the arrow 14. It will be further seen that the carriers arriving from the incoming ducts and received by the transport chain are so entrained by the latter that the virtual axis of the carrier lies vertical to the direction of motion of the conveyor chain. The carriers lying on the chain are resting with their heads abutting against rails 15′ (Fig. 4). A rail 15 (Fig. 2) is also provided bordering the receiving track 3 which, similar to the conveyor chain, is sloped while being positioned above the latter.

Figure 3:
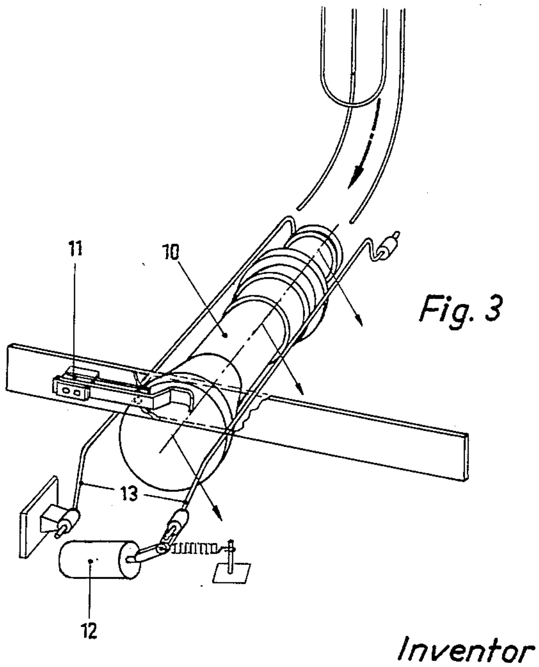
Fig. 3 is a schematic view of a carrier that has been released from the receiving track to the conveyor chain.

Fig. 2 shows a receiving track onto which a carrier has entered it being stopped by the rail 15. The head up carrier 10 opens a contact 11, arranged on the rail, which contact electrically prevents release of a succeeding carrier from the separator associated with this receiving track, by electric means (not shown). As soon as the carrier, as shown in Fig. 3, leaves the receiving track, contact 11 is reactuated whereby the carrier contained in the separator is released and conduct on to the receiving track.

Contacts 11′, 11″ are also arranged at spaced intervals along the rail 15′ which rail is parallel to the direction of travel of the chain 7 and which lies beneath the receiving tracks 3. When a carrier lies between the rollers 16 comprising a chain section 23 (Fig. 4), then it has locked the electromagnet 12 of the receiving track above, by actuation of contact 11′. A carrier that happens to be on this receiving track, can thus not gain access to this chain section. This was possible, however, in section 14, since contact 11″ remained unaffected and therefore attraction of the electromagnet 12′ could occur for the purpose of opening the receiving track.

As carriers are transported between rollers 16 on the chain 7, they are directed downwardly at the end of the run off chain 7 as the chain progresses over the sprockets 4. This redirection is achieved by curved tracks 9 as shown in Fig. 1 and which curve tracks communicate with straight track 9′ shown in Figs. 1 and 5.

After redirection the carriers are rolled along on fixed and movable bottom rests (18, 19) (Fig. 5) by means of rollers 16 of the conveyor chain 7. The bottom rests are arranged underneath the return track.

The movable rests 19 are caused to open by known electromagnetic means (not shown) which means are controlled by the sensing fingers 38 which are disposed on mounting means 21 carried on each of the fixed bottom rests 18. The arrangement is such that when a carrier rolls over the sensing fingers 38 the sensing fingers will cause its associated bottom rest 19 to open providing the destination marking on the carrier is such as to complete a circuit for the electromagnetic actuating means for the bottom rests 19 of which fingers 38 are a part.

Figure 5:
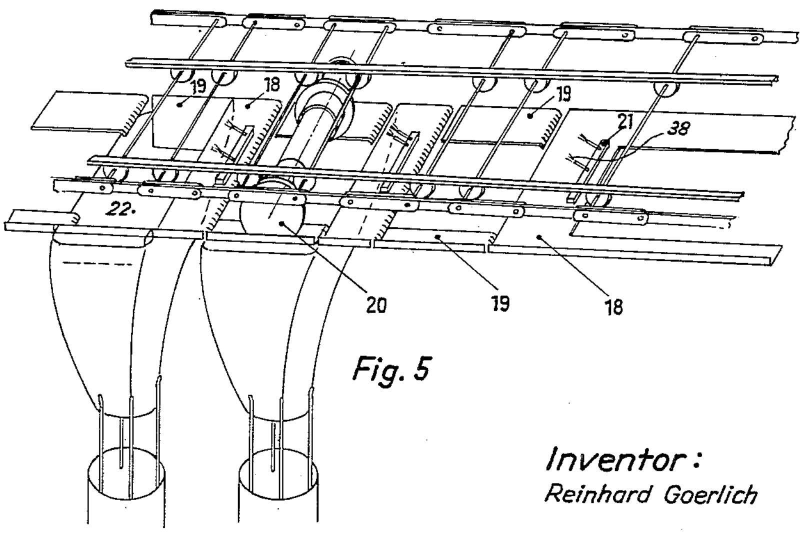
Fig. 5 is a schematic view illustrating a section of the return track.

A carrier positioned over a closed bottom trap is shown in Fig. 5 at 20. If the destination marking of the carrier coincides with the adjustment of the sensing fingers 38 which sense it, the bottom trap 19′ opens and the carrier is directed, over the exit funnel 22 linked thereto and through the round bar guide channel connected to funnel

22, into the outgoing tube duct 1″. Summing up, it may thus be said:

The carriers arriving from the incoming tube ducts and conducted out by means of the carrier separator 1, are directed over receiving tracks to the chain of a conveyor device by means of the movable receiving tracks 3 which permit the carriers to fall onto the conveyor chain. The carriers then are conveyed atop of two pairs of roller 16 to the guide tracks 9 and are then redirected and caused to move in an opposite direction along track 9′ to be sensed by sensing fingers 38 and to drop into the proper outgoing duct 1″ upon the selective operation of movable bottom 19. Movable bottom rests are arranged over funnel-shaped intermediate links that lead to the outgoing tube ducts.

Apart from the outgoing tube ducts, there are provided in Fig. 1 two additional conducting positions that separate from each other carriers with wrongly adjusted destination markings and those with defective destination marking devices. For the first case, there is arranged ahead of the corresponding bottom traps a multiple sensing device adjusted to read all possible destination markings on the carrier to provide against the possibility that a carrier pass through all the proceeding sensing devices 38 and failed to cause the triggering of a movable bottom 19 because of a possible wrongful adjusted destination marking.

Thus, all carriers which overshot their proper destination and which arrive at the first additional conducting position and by examination of such carriers the defective sensing fingers could readily be identified.

If this multiple sensing finger finds no valid destination mark on the carriers, then the bottom traps still remain closed whereupon the carriers are directed to a shunting position without sensing fingers. The reasons for this rejection can be immediately ascertained by the operating personnel, in order to confine to narrow limits the extent of an operational trouble by immediately sorting out such carriers.

The entire reload device including the associated parts is suitably enclosed by a cabinet with an inclined panel. By reason of such a construction, changing over from a manually operated pneumatic tube plant to a full automatic system may be accomplished without undue difficulty. If with a manual installation the incoming and outgoing tube ducts are at variance with the described sample design as regards spatial arrangement, the reload contrivance can at any time be adapted to spatial requirements.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A pneumatic tube reload device comprising a plurality of incoming ducts, a plurality of outgoing ducts, means for selectively directing carriers from said incoming ducts to said outgoing ducts comprising a plurality of receiving tracks, each associated with a different one of said incoming ducts, single conveyor means common to each of said tracks and said outgoing ducts, means associated with each of said tracks for normally delivering carriers to said conveyor means at random times, and delay means associated with said conveyor means and coacting with said delivery means for delaying delivery of carriers from said tracks to said conveyor means when portions of said conveyor means in proximity to said tracks are occupied by carriers previously delivered thereto.

2. A pneumatic tube reload device as claimed in claim 1, wherein said means for selectively directing carriers from said incoming ducts to said outgoing ducts further comprises an endless chain situate beneath said tracks and operating in a direction normal to said tracks.

3. A pneumatic tube reload device as claimed in claim 2, wherein said conveyor chain comprises a pair of parallel chains, a plurality of rods interconnecting said chains and extending normal to the direction of movement of said chains, a pair of rollers spacedly mounted on each of said rods, a pair of spaced parallel guide rails extending in a direction parallel to the direction of said chain, said rollers operable to ride on said guide rails, the rollers on adjacent rods adapted to receive and transport a carrier thereon.

4. A pneumatic tube device as claimed in claim 2, wherein said conveyor chain further comprises a pair of curved, end guide channels adjacent an end of said chain, said guide channels adapted to maintain carriers conveyed by said chain in contact with said chain while proceeding in a non-horizontal direction.

5. A pneumatic tube reload device as claimed in claim 1, wherein said receiving tracks comprise a pair of parallel spaced elements having a normal spacing less than the diameter of a carrier, at least one of said elements operable to pivot in a direction away from the other of said elements a distance greater than the diameter of a carrier, electromagnetic means coupled to said pivotal element and adapted to pivot said element in a direction away from the other of said elements, spring means coupled to said pivotal element for normally urging said pivotal element to pivot in a direction toward the other of said elements against the force exerted by said electromagnetic means.

6. A pneumatic tube reload device as claimed in claim 5, wherein said means for normally delivering carriers to said conveyor means comprises a switch element in the path of a carrier moving onto each of said receiving tracks, said switch element for controlling operation of said electromagnetic means.

7. A pneumatic tube reload device as claimed in claim 6, wherein said delay means further comprises a plurality of additional switch elements, each spaced along a portion of said conveyor chain and in proximity to a different one of said receiving tracks, each of said additional switch elements coacting with a corresponding switch element associated with said receiving tracks, said additional switch elements adapted to be operated by any carrier conveyed on said chain.

8. A pneumatic tube reload device as claimed in claim 1, wherein said means for selectively directing carriers from said incoming ducts to said outgoing ducts comprises a lower guide rail, disposed parallel to and beneath said conveyor means and spaced therefrom a distance substantially equal to the diameter of a carrier.

9. A pneumatic tube reload device as claimed in claim 8, wherein said guide rail is provided with a plurality of movable portions, said movable portions movable downwardly in a direction normal to the direction of travel of said conveyor means, said movable portions operable to open a recess of sufficient size to accommodate a carrier therein.

10. A pneumatic tube reload device as claimed in claim 9, wherein said movable portions are in proximity to the extrance of said outgoing ducts.

11. A pneumatic tube reload device as claimed in claim 10, further comprising a plurality of sensing finger sets for sensing different characteristic markings of carriers conveyed by said carrier means, a different one of said sensing finger sets adjacent a different one of said movable portions, each sensing finger set operable to control movement of its associated movable portion upon sensing of a carrier having markings characteristic of the outgoing duct associated with said associated movable portion.

References Cited in the file of this patent

UNITED STATES PATENTS

| | | |
|---|---|---|
| 1,757,416 | Cowley et al. | May 6, 1930 |
| 2,014,578 | MacMartin | Sept. 17, 1935 |
| 2,052,597 | Beckmann | Sept. 1, 1936 |
| 2,207,434 | Haven | July 9, 1940 |